United States Patent
Ikeda et al.

(10) Patent No.: US 9,425,518 B2
(45) Date of Patent: Aug. 23, 2016

(54) CONNECTION STRUCTURE OF CONDUCTOR AND FLAT CABLE, AND POWER SUPPLY DEVICE USING THE CONNECTION STRUCTURE

(71) Applicant: YAZAKI CORPORATION, Minato-ku, Tokyo (JP)

(72) Inventors: Tomohiro Ikeda, Shizuoka (JP); Yutaka Wakatsuki, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 14/850,024

(22) Filed: Sep. 10, 2015

(65) Prior Publication Data

US 2015/0380836 A1    Dec. 31, 2015

Related U.S. Application Data

(63) Continuation of application No. PCT/JP2014/056445, filed on Mar. 12, 2014.

(30) Foreign Application Priority Data

Mar. 15, 2013    (JP) ................................. 2013-053467

(51) Int. Cl.
| | |
|---|---|
| *H01R 4/24* | (2006.01) |
| *H01R 12/59* | (2011.01) |
| *H01R 12/65* | (2011.01) |
| *H01R 25/14* | (2006.01) |
| *H01R 4/02* | (2006.01) |

(Continued)

(52) U.S. Cl.
CPC ............. *H01R 4/2495* (2013.01); *H01M 2/206* (2013.01); *H01R 4/023* (2013.01); *H01R 4/182* (2013.01); *H01R 12/59* (2013.01); *H01R 12/65* (2013.01); *H01R 25/14* (2013.01)

(58) Field of Classification Search
CPC ........ H01R 12/59; H01R 12/65; H01R 25/14; H01R 4/182; H01R 4/2495; H01R 4/023; H01M 2/206
USPC ......... 439/422, 492, 391, 395, 397, 410, 874, 439/404
See application file for complete search history.

(56) References Cited

U.S. PATENT DOCUMENTS

| | | | | |
|---|---|---|---|---|
| 4,920,642 A | * | 5/1990 | Yanai ................... | H01R 12/592 29/860 |
| 5,061,202 A | * | 10/1991 | Nemcovsky ......... | H01R 12/675 439/404 |

(Continued)

FOREIGN PATENT DOCUMENTS

| | | |
|---|---|---|
| JP | H09-301096 A | 11/1997 |
| JP | 2010-055885 A | 3/2010 |

(Continued)

*Primary Examiner* — Edwin A. Leon
(74) *Attorney, Agent, or Firm* — Mots Law, PLLC

(57) ABSTRACT

In a connection structure, a conductor connection terminal part which can connect to a connection end of the conductor in any position in a direction perpendicular to the arrangement direction of the conductor and a cable connection terminal part which is connected to a core wire of a flat cable are formed on a connection terminal, and by connecting the cable connection terminal part to either one of core wires of the flat cable, a connection position of the connection end of the conductor with the conductor connection terminal part is relatively displaced.

5 Claims, 5 Drawing Sheets

(51) Int. Cl.
*H01R 4/18* (2006.01)
*H01M 2/20* (2006.01)

(56) References Cited

U.S. PATENT DOCUMENTS

| | | | |
|---|---|---|---|
| 5,841,070 A | 11/1998 | Takiguchi et al. | |
| 7,234,961 B2 * | 6/2007 | Arlitt | H01R 4/24 439/212 |
| 7,255,590 B2 * | 8/2007 | Schremmer | H01R 12/675 439/404 |
| 9,065,125 B2 | 6/2015 | Ogasawara et al. | |
| 2010/0055993 A1 | 3/2010 | Ikeda et al. | |
| 2013/0017712 A1 * | 1/2013 | Liu | H01R 13/2442 439/391 |

FOREIGN PATENT DOCUMENTS

| | | |
|---|---|---|
| JP | 2012-109196 A | 6/2012 |
| JP | 2012-138284 A | 7/2012 |
| JP | 2013-098032 A | 5/2013 |
| JP | 2014-503934 A | 2/2014 |
| WO | 2012/053581 A1 | 4/2012 |

* cited by examiner

CONNECTION STRUCTURE OF CONDUCTOR AND FLAT CABLE, AND POWER SUPPLY DEVICE USING THE CONNECTION STRUCTURE

CROSS REFERENCE TO RELATED APPLICATIONS

This application is a continuation of International Application No. PCT/JP2014/056445, filed Mar. 12, 2014, and based upon and claims the benefit of priority from Japanese Patent Application No. 2013-053467, filed Mar. 15, 2013, the entire contents of all of which are incorporated herein by reference.

TECHNICAL FIELD

The present invention relates to a connection structure which connects a conductor such as a busbar and a flat cable, and a power supply device in which such a connection structure is used.

BACKGROUND

A power supply device which becomes a driving source of an electric motor of a hybrid vehicle, an electric vehicle, and the like is formed by forming a set of battery cell assembly by assembling in parallel a plurality of unit cells from which positive electrodes and negative electrodes are protruded from the top faces thereof and connecting positive electrodes and negative electrodes of adjacent unit cells with each other in series, and further connecting a plurality sets of this battery cell assembly.

In such a power supply device, a positive electrode and a negative electrode of each unit cell that constitutes the battery cell assembly are connected to electrodes of adjacent unit cells in series by a conductor such as a busbar. Also, in the power supply device, electric wires for voltage detection are utilized for successively detecting and monitoring a voltage of each unit cell that constitutes the battery cell assembly, and terminals for connection between these electric wires and the positive electrodes and negative electrodes are provided on the battery cell assembly.

As a structure that detects a voltage of each unit cell, JP 2012-138284 A (PTL 1) describes using a flat cable as an electric wire for voltage detection, arranging this flat cable along the stacking direction of the unit cells that are stacked in parallel, and connecting this flat cable and the electrodes of the unit cells by conductors such as busbars. The flat cable has a plurality of rows of core wires arranged in the width direction, and the core wires of the flat cable and the conductors such as the busbars are connected by clip-shaped terminals.

SUMMARY

However, in the structure of PTL 1, in order to connect the core wires of the flat cable arranged in the width direction to the terminals of clip-shape, it is necessary that a coupling part having a length that matches the position of the core wire in the width direction in the flat cable is provided in each of the terminals. This coupling part has a different length depending on the position of the core wire in the width direction. Therefore, it is necessary that the terminal is manufactured to have different lengths of coupling parts that match the positions of the core wires of the flat cable, which requires more metal molds for manufacturing and which makes the management hard due to the increased varieties of terminals.

Also, in the structure of PTL 1, when the terminals are connected to the flat cable before they are connected to the conductors such as the busbars, it is not desirable since the flat cable becomes pulled when connecting to the conductors such as the busbars later on. Therefore, the order of the assembly becomes limited.

Thus, an object of the present invention is to provide a connection structure of a conductor and a flat cable which does not require use of terminals having coupling parts of different lengths and which is not limited in the order of the assembly, and to provide a power supply device in which such a connection structure is used.

A connection structure according to a first aspect is a connection structure for connecting a plurality of conductors having plate-like connection ends arranged in a plurality of rows and a flat cable arranged adjacent to the conductors to be long along a direction of the plurality of rows of the conductors, and includes: the flat cable having a plurality of core wires arranged in parallel along the direction of the plurality of rows of the conductors, the flat cable being covered by a flexible covering body; and connection terminals each including a conductor connection terminal part provided on one end which is connectable to the connection ends of the conductors at any position in a direction that crosses the arrangement direction of the conductors and a cable connection terminal part provided on the other end which is connected to the corresponding core wire of the flat cable. A connection position of the connection end of the corresponding conductor with the conductor connection terminal part is relatively displaced by the cable connection terminal part being connected to either one of the core wires of the flat cable.

With such a structure, it becomes unnecessary to use connection terminals having different lengths, and the flat cable and the conductors can be connected using the connection terminals each having the same shape. Therefore, it is not necessary that a plurality of metal molds are used for manufacturing the connection terminals, and it is not only possible to reduce the cost of parts used but it also becomes easy to manage the connection terminals.

Moreover, since the conductors of the same shape also can be used, it is not only possible to make the manufacturing of the conductors easy but the management becomes easy also.

Furthermore, since there is a degree of freedom in the order of assembling the conductors with the flat cable, the assembly becomes easy.

Preferably the conductor connection terminal part includes a gripping piece capable of gripping the connection end of the corresponding conductor from both sides, and the cable connection terminal part includes a pressure-welding part that is capable of piercing through the covering body and connectable to the corresponding core wire.

With such a structure, the connection terminals can be pressure-welded to the flat cable simultaneously. Thus, operability of the connection is improved.

Preferably a cutout part that allows relative displacement of the connection position between the connection end of the corresponding conductor and the conductor connection terminal part is formed in a longitudinal direction of the connection end of the corresponding conductor.

With such a structure, even if relative position between the connection end of the corresponding conductor and the conductor connection terminal part of the corresponding connection terminal differs, the difference in the relative position can be absorbed and the connection of the corresponding conductor with the flat cable via the corresponding connection terminal can be performed reliably.

A power supply device according to a second aspect of the present invention includes: a plurality of unit cells from which positive electrodes and negative electrodes are protruded from upper faces thereof; an insulation plate mounted on the upper faces of the plurality of unit cells, the insulation plate having electrode penetration slits through which the positive electrodes and the negative electrodes penetrate to be protruded on an upper face side; a plurality of connection conductors having plate-like connection ends arranged in a plurality of rows on the insulation plate, the plurality of connection conductors connecting the positive electrodes and the negative electrodes of the plurality of unit cells respectively in series; a flat cable arranged adjacent to the connection conductors, the flat cable having a plurality of core wires arranged in parallel along a direction of the plurality of rows of the connection conductors, the flat cable being covered by a flexible covering body; and connection terminals each including a conductor connection terminal part provided on one end which is connectable to the connection end of the corresponding connection conductor at any position in a direction that crosses the arrangement direction of the corresponding connection conductor, and a cable connection terminal part provided on the other end which is connected to the corresponding core wire of the flat cable.

Since the conductor connection terminal part of each of the connection terminals is connectable at any position in a direction that crosses the arrangement direction of the connection conductors, it is possible to connect the flat cable with the connection conductors using the connection terminals each having the same shape. Therefore, it is not necessary that connection terminals of different lengths are used, and it is not necessary that a plurality of metal molds are used for manufacturing the connection terminals, and it is not only possible to reduce the cost of parts used but it also becomes easy to manage the connection terminals.

Moreover, since the connection conductors of the same shape also can be used, it is not only possible to make the manufacturing of the connection conductors easy but the management becomes easy also.

Preferably the conductor connection terminal part includes a gripping piece capable of gripping the plate-like connection end of the corresponding connection conductor from both sides, and the cable connection terminal part of the connection terminal includes a pressure-welding part that pierces through the covering body of the flat cable and is connectable to the corresponding core wire.

With such a structure, the connection terminals can be pressure-welded to the flat cable simultaneously. Thus, operability of the connection is improved.

DESCRIPTION OF EMBODIMENTS

Figure 1:
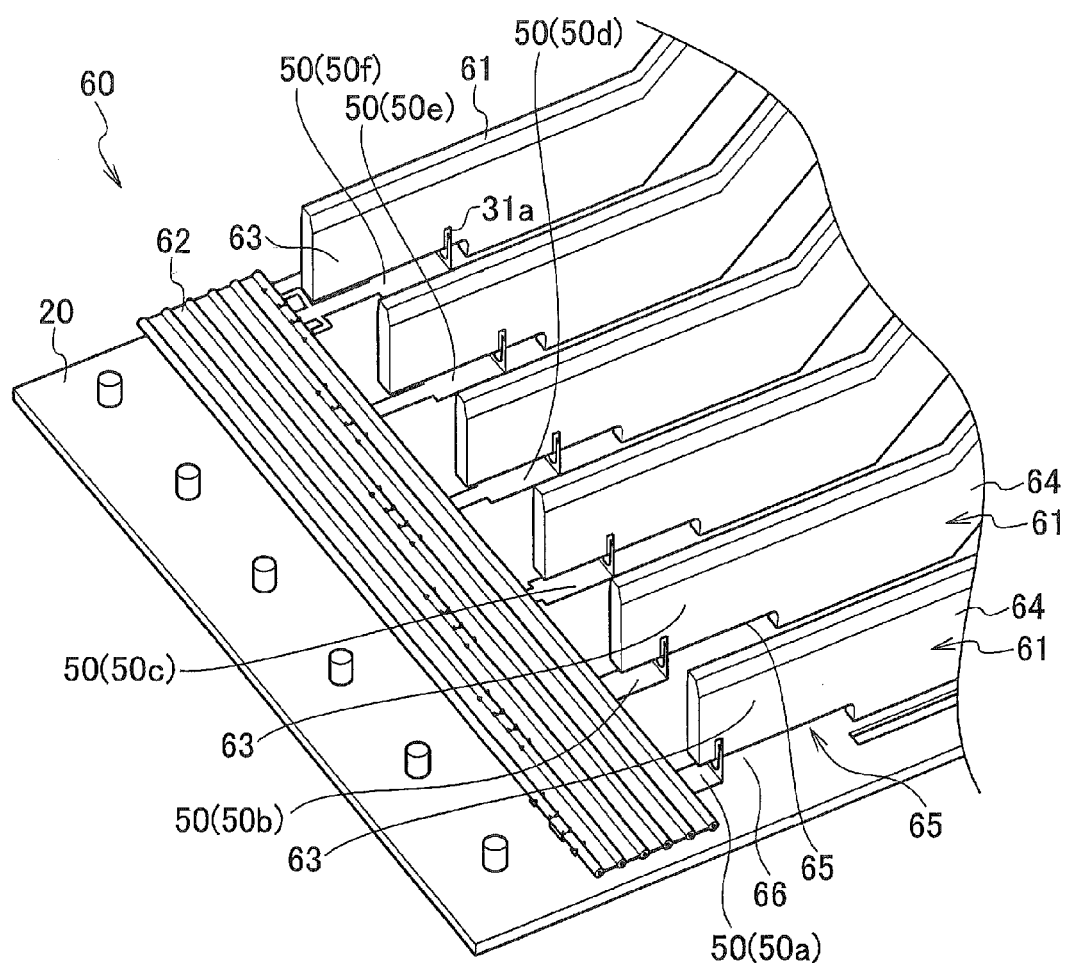
FIG. 1 is a perspective view illustrating a connection structure of conductors and a flat cable according to a first embodiment.

Hereinafter, embodiments of the present invention will be explained in detail by referring to the drawings.

First Embodiment

Figure 2:
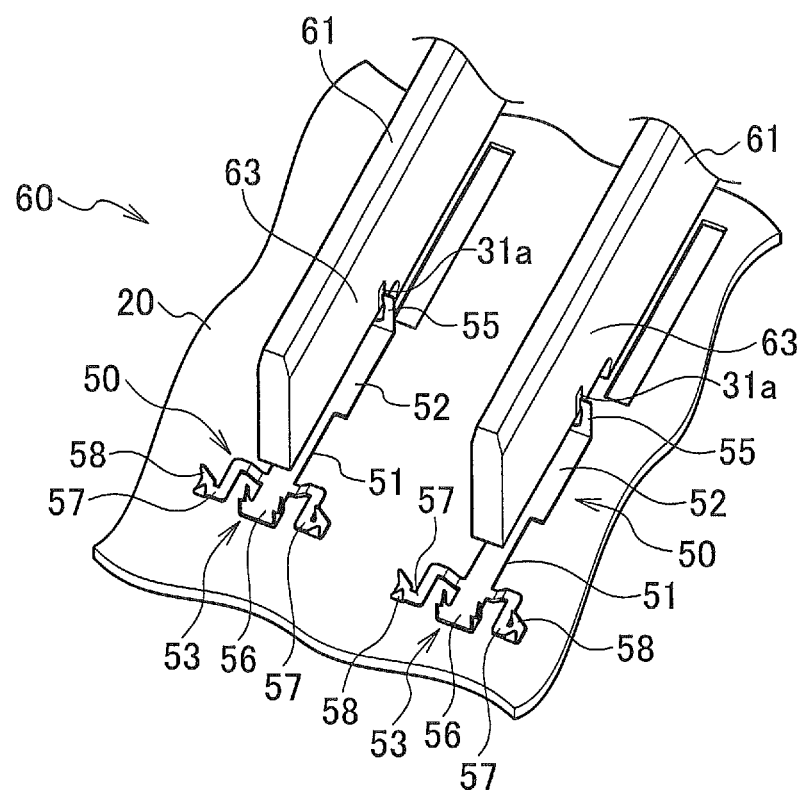
FIG. 2 is a perspective view illustrating a state of connecting the conductors by connection terminals in the first embodiment.

FIGS. 1 and 2 illustrate a first embodiment, and illustrate a connection structure 60 of conductors and a flat cable.

The connection structure 60 according to the first embodiment includes a plurality of conductors 61 each composed of a busbar, a flat cable 62 connected to the conductors 61, and connection terminals 50 for connecting the conductors 61 and the flat cable 62. The conductors 61, the flat cable 62, and the connection terminals 50 are supported on a flat insulation plate 20 for the connection to be made.

The conductors 61 are for connecting electrodes of a power supply device (not illustrated) with the flat cable 62, and each of the conductors 61 is formed in a long plate-like shape as a whole. Each of the conductors 61 includes a long conductor body 64, a first connection end 63 provided on one end of the conductor body 64, and a second connection end (not illustrated) provided on the other end of the conductor body 64. The first connection end 63 is made plate-like, and is connected to the flat cable 62 by facing the flat cable 62 side. The second connection end is connected to the electrode (not illustrated) of the power supply device. The conductors 61 are provided to match the number of the electrodes of the power supply device. Therefore, the conductors 61 are arranged in a plurality of rows.

As illustrated in FIG. 1, a cutout part 65 is provided in the lengthwise direction on the lower face of the first connection end 63, and the first connection end 63 is in a state of being risen relative to the insulation plate 20. By forming the cutout part 65, a space 66 is formed between the first connection end 63 and the insulation plate 20. When connecting the conductors 61 and the flat cable 62 via the connection terminals 50, the conductors 61 and the connection terminals 50 are capable of relative displacement as much as the length of the cutout part 65 (space 66). Thus, it is possible to adjust a position of each of the conductors 61 relative to the corresponding connection terminal 50.

The flat cable 62 includes core wires arranged in parallel in the width direction, and a flexible covering body that covers the plurality of core wires. The flat cable 62 extends long along the direction of the conductors 61 at a position adjacent to the conductors 61, and is arranged to be approximately perpendicular to the longitudinal direction of the conductors 61. By arranging the flat cable 62 relative to the conductors 61 as such, the core wires in the parallel state become in a state of being arranged along the direction that is separated away from the position adjacent to the conductors 61 in order.

The connection terminals 50 are for connecting each of the conductors 61 with the corresponding core wire of the flat cable 62, and the same number as that of the conductors 61 is provided. As illustrated in FIG. 2, each of the connection terminals 50 includes a terminal body 51 that extends along the longitudinal direction of the conductor 61, and a conductor connection terminal part 52 and a cable connection terminal part 53 that are integrally formed at both ends in the longitudinal direction of the terminal body 51. The conductor connection terminal part 52 connects with the first connection end 63 of the conductor 61. The cable connection terminal part 53 connects with a core wire of the flat cable 62.

The conductor connection terminal part 52 is formed by being bent upward from an end on the conductor 61 side of the terminal body 51. The conductor connection terminal part 52 includes a pair of gripping pieces 55 that grip the first connection end 63 of the conductor 61 from both sides.

The cable connection terminal part 53 is formed at an end on the flat cable 62 side of the terminal body 51, and in the first embodiment, the cable connection terminal part 53 includes a first pressure-welding part 56 which is integrally provided consecutively in the longitudinal direction of the terminal body 51, and second pressure-welding parts 57 provided on both sides of the first pressure-welding part 56 by being branched to the left and right from the terminal body 51. Pressure welding blades 58 of pointed tip bent upward are integrally formed at each of the first pressure-welding part 56 and the second pressure-welding parts 57. The pressure welding blades 58 of the first pressure-welding part 56 and the second pressure-welding parts 57 bite into the flat cable 62 so as to pierce the covering body of the flat cable 62, and by piercing the covering body the pressure welding blades 58 of the first pressure-welding part 56 and the second pressure-welding parts 57 are pressure-welded to the corresponding core wire within the covering body to be connected to the corresponding core wire.

Next, a connection method according to the first embodiment will be explained.

First, the connection terminals 50 are connected to the respective core wires that are provided at the flat cable 62 in parallel. The connection between each of the core wires of the flat cable 62 and each of the connection terminals 50 is performed by the first pressure-welding part 56 and the second pressure-welding parts 57 of the cable connection terminal part 53. Each of the core wires and each of the connection terminals 50 are connected by the pressure welding blades 58 of the first pressure-welding part 56 and the second pressure-welding parts 57 piercing the covering part of the flat cable 62 to be pressure welded to each of the core wires. At this time, the terminal body 51 of each of the connection terminals 50 becomes in a state of extending in a direction that crosses the width direction of the flat cable 62 (perpendicular direction of the flat cable 62). Such connection can be performed by pressure-welding the plurality of connection terminals 50 simultaneously, thus making the connection operation with the flat cable 62 efficient.

Since the core wires of the flat cable 62 are provided in parallel in the direction that is perpendicular to the width direction of the flat cable 62, a protruding length of the terminal body 51 of each of the connection terminals 50 becomes different depending on the position of the corresponding core wire in the width direction. In other words, as illustrated in FIG. 1, the connection terminal 50 (50a) of the front-most side has the least protruding length of the terminal body 51 toward the conductor 61 by being connected to the core wire that is farthest from the conductor 61. Also, the connection terminal 50 (50f) of the back-most side has the longest protruding length of the terminal body 51 toward the conductor 61 by being connected to the core wire that is closest to the conductor 61. Regarding the rest of the connection terminals 50 (50b, 50c, 50d, 50e) in between, as illustrated in FIG. 1, the protruding length of each terminal body 51 that extends toward the conductor 61 from the flat cable 62 becomes in a state of being different in order.

After connecting the connection terminals 50 to the flat cable 62, the connection terminals 50 are fixed on the insulation plate 20, and the conductors 61 are connected to the respective connection terminals 50. Connection of each of the conductors 61 is performed by causing the first connection end 63 of each of the conductors 61 to be held by the gripping pieces 55 of the conductor connection terminal part 52 from above. At this time, since the cutout part 65 is formed at the lower face of the first connection end 63 of each of the conductors 61, the space 66 is formed between the first connection end 63 and the insulation plate 20. Therefore, relative displacement of each of the conductors 61 is possible to adjust the position of the first connection end 63 relative to the position of the conductor connection terminal part 52. Therefore, it is possible to make adjustment with respect to the protruding length of the terminal body 51 of each of the connection terminals 50 that extend from the flat cable 62, and the difference in the protruding length of the terminal body 51 of each of the connection terminals 50 can be absorbed. In such a connection structure 60, even if relative position between the first connection end 63 of each of the conductors 61 and the conductor connection terminal part 52 of each of the connection terminals 50 differs for each connection terminal 50 (50a, 50b, 50c, 50d, 50e, 50f), this difference in the relative position can be absorbed in the connection.

In the first embodiment, connection other than the above connection method can be performed. That is, after the connection terminals 50 are fixed to the insulation plate 20, the first connection end 63 of each of the conductors 61 is held in the conductor connection terminal part 52 of each of the connection terminals 50 to be connected. Then, by causing the connection terminals 50 to be displaced along the first connection ends 63 of the conductors 61, the cable connection terminal parts 53 of the respective connection terminals 50 are aligned with corresponding core wires of the flat cable 62. After this alignment, the flat cable 62 is pressed against the connection terminals 50 to connect each core wire to the cable connection terminal part 53.

Such change of the connection method becomes possible because the conductors 61 and the connection terminals 50 are made capable of relative displacement and are mutually adjustable by forming the cutout part 65 on the lower face of the first connection end 63 of each of the conductors 61. Thus, the conductor connection terminal part 52 of each of the connection terminals 50 is capable of connection at any position that crosses (is perpendicular to) the arrangement direction of the conductors 61.

According to the first embodiment, since the flat cable 62 and the conductors 61 can be connected by using the connection terminals 50 each having the same shape, it becomes unnecessary to use connection terminals of different lengths. Therefore, it is not necessary that a plurality of metal molds are used for manufacturing the connection terminals 50, and it is not only possible to reduce the cost of parts used but it also becomes easy to manage the connection terminals 50.

Moreover, since the conductors 61 each having the same shape also can be used, it is not only possible to make the manufacturing of the conductors 61 easy but the management becomes easy also.

Furthermore, since there is a degree of freedom in the order of assembling the conductors 61 with the flat cable 62, the assembly becomes easy.

Also, since the connection terminals 50 can be pressure-welded to the flat cable 62 simultaneously, operability of the connection is improved.

In the first embodiment, while the cutout part 65 is formed on the lower face of the first connection end 63 of each of the conductors 61, the cutout part 65 can be formed on the upper face of the first connection end 63 instead. In this case, the conductor connection terminal part 52 of each of the connection terminals 50 is connected from above of the first connection end 63, and in this case also, by relative displacement of the first connection end 63 of each of the conductors 61 with each of the connection terminals 50, difference in the positional relationship of the terminal body 51 of each of the connection terminals 50 is absorbed and the connection can be made simply and easily.

Second Embodiment

Figure 3:
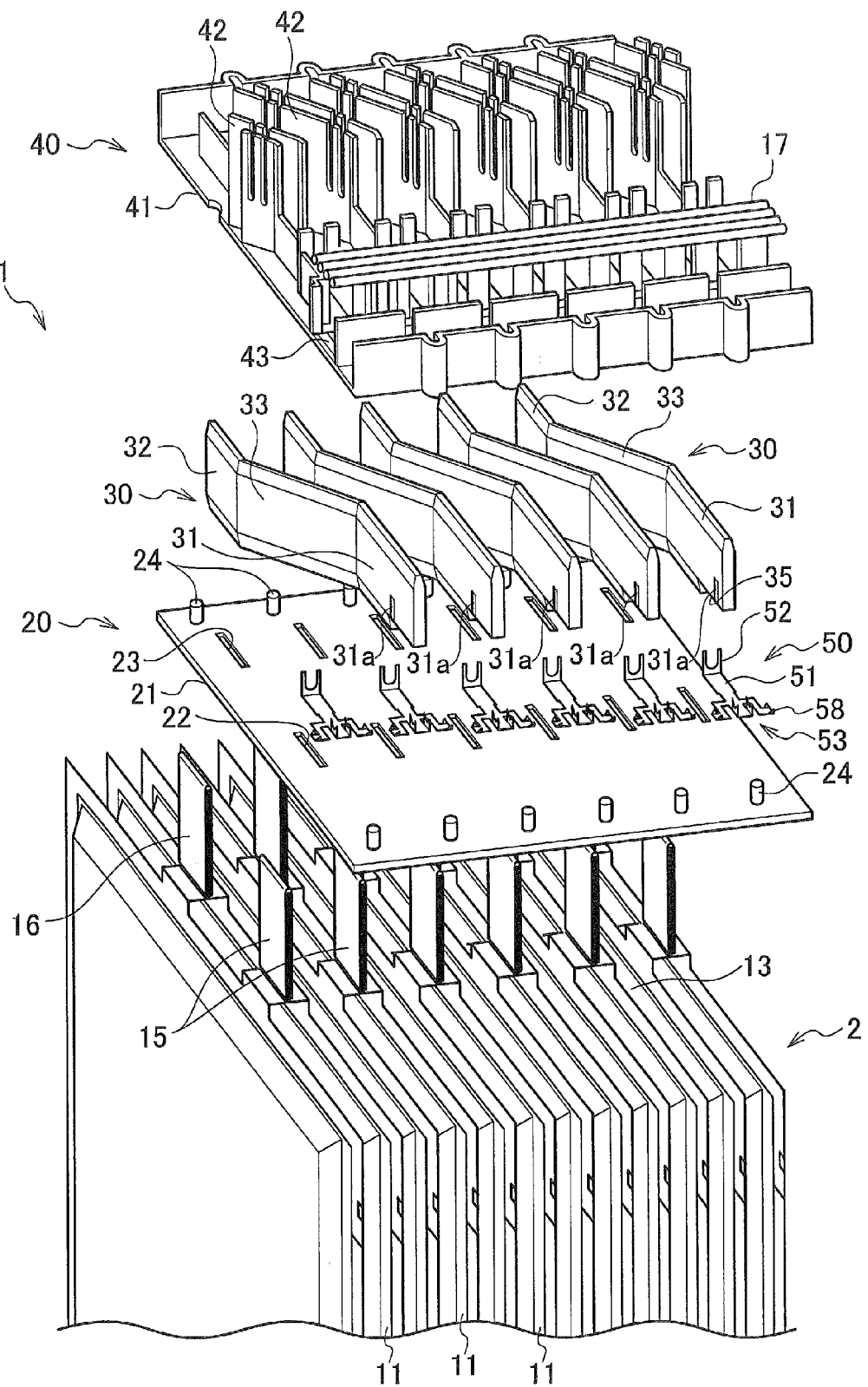
FIG. 3 is an exploded perspective view illustrating a power supply device according to a second embodiment.
Figure 4:
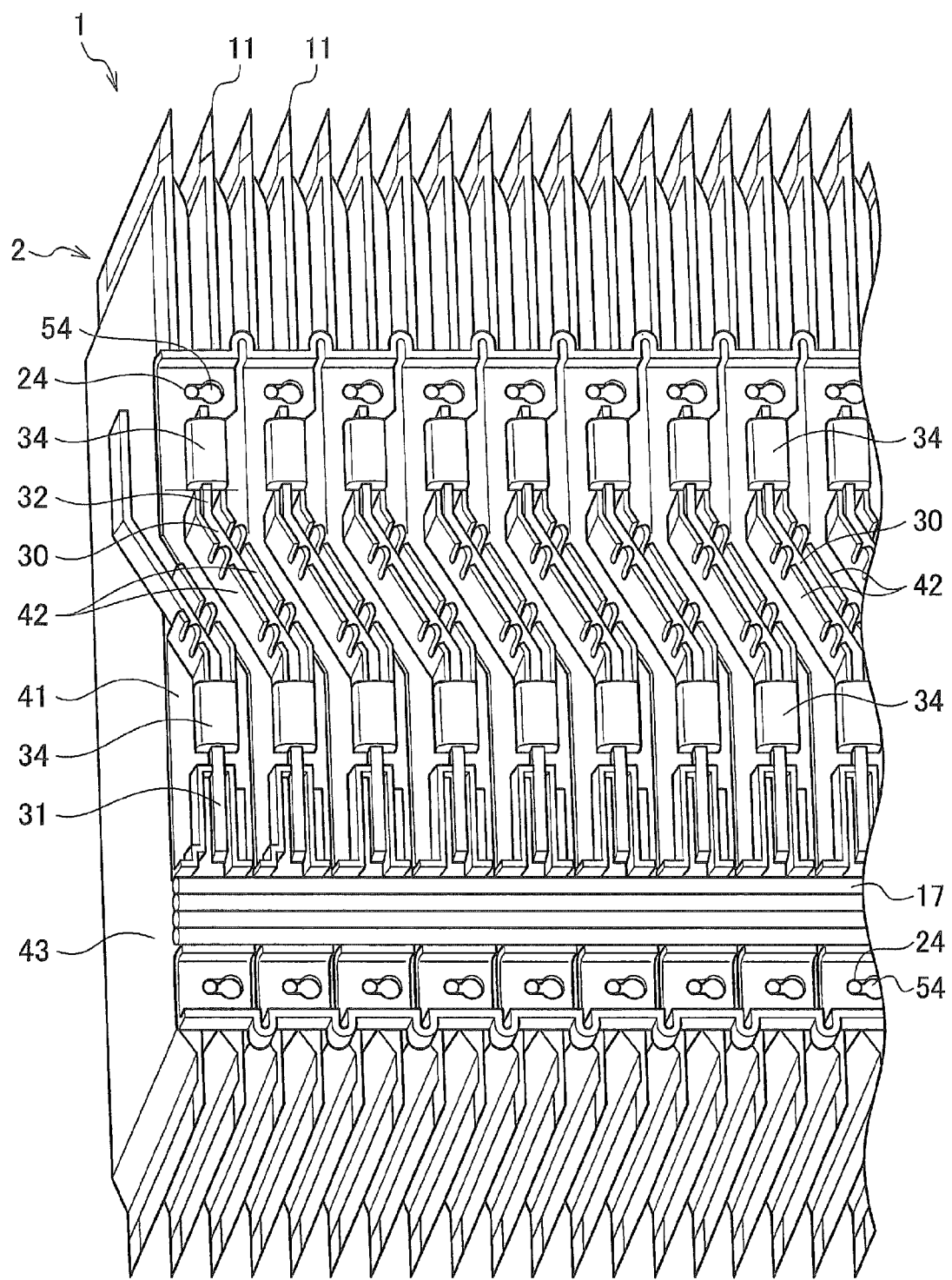
FIG. 4 is a perspective view illustrating from the top face an assembly state of the power supply device according to the second embodiment.
Figure 5:
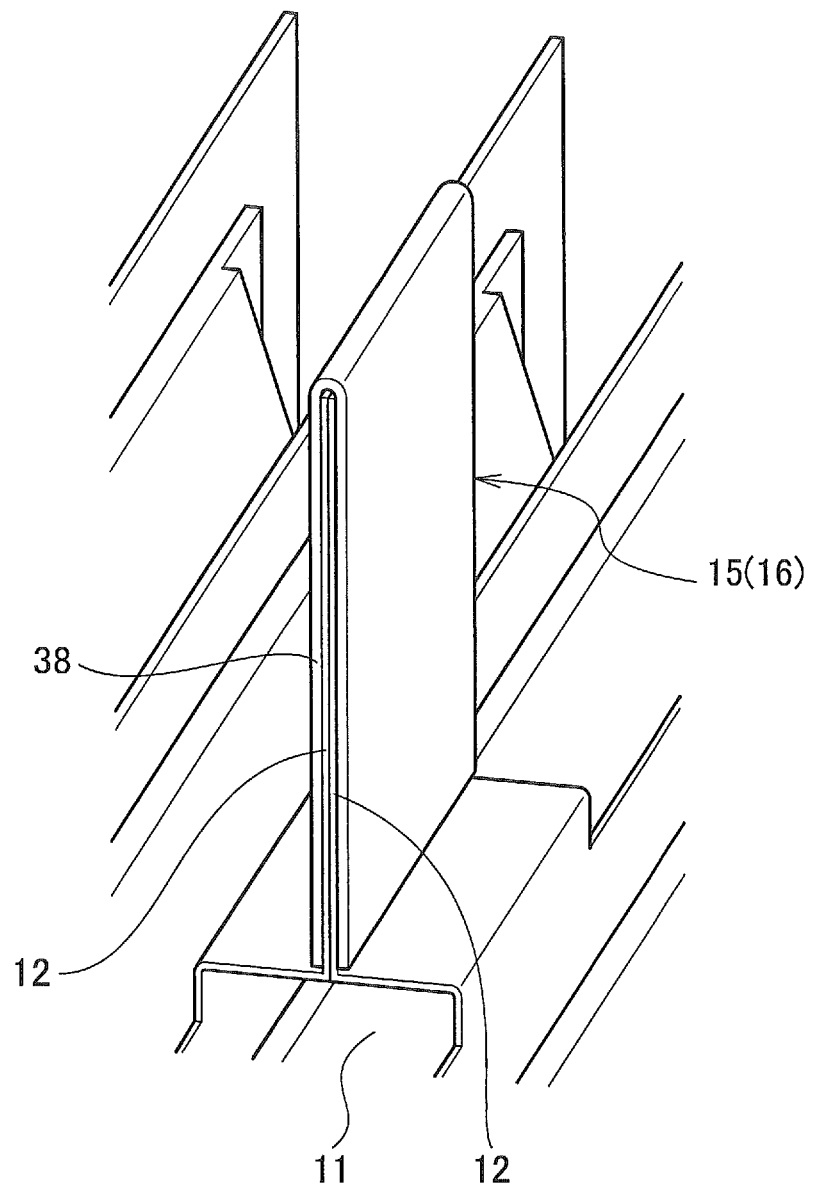
FIG. 5 is a perspective view illustrating a positive electrode (negative electrode) formed on a unit cell in the second embodiment.

FIGS. 3 to 5 illustrate a second embodiment, and illustrate a power supply device 1 in which the connection structure according to the first embodiment is applied. Also, the same members as in the first embodiment as illustrated in FIGS. 1 and 2 are assigned with the same reference numbers to correspond.

The power supply device 1 according to the second embodiment is mounted on an electric vehicle having an electric motor as the driving source, a hybrid vehicle having both an engine and an electric motor as the driving source, and the like, and supplies electricity to the vehicle-mounted electric motor.

The power supply device 1 is composed by arranging a plurality of battery cell assemblies (battery modules) 2 lengthwise and breadthwise, and each battery cell assembly 2 is formed by stacking a plurality of unit cells 11 in parallel.

Each of the unit cells 11 has a rectangular thin-plate shape, and as illustrated in FIG. 5, a cell electrode 12 protrudes from the upper face 13 on the outer periphery of each of the unit cells 11. Then, by joining and connecting the cell electrodes 12 that extend from two unit cells 11 with an electrode plate 38, one positive electrode 15 or one negative electrode 16 is formed. Thus, as illustrated in FIG. 3, the positive electrodes 15 and the negative electrodes 16 become in a state of protruding in the same direction from the upper face 13 of the battery cell assembly 2.

Further, in the second embodiment, the unit cells 11 are stacked in parallel such that the positive electrodes 15 and the negative electrodes 16 are mutually positioned on the same side on the upper face 13 of the battery cell assembly 2. In FIG. 3, the positive electrodes 15 are mutually positioned on the front side of the battery cell assembly 2, and the negative electrodes 16 are mutually positioned on the back side of the battery cell assembly 2; however, it can also be that the positive electrodes 15 are mutually positioned on the back side and the negative electrodes 16 are mutually positioned on the front side.

For each battery cell assembly 2, an insulation plate 20, connection conductors 30, and a case 40 are arranged. Further, a flat cable 17 for detecting a voltage between the positive electrode 15 and the negative electrode 16 of the unit cell 11 is provided. The insulation plate 20 corresponds to the insulation plate 20 of the first embodiment, and the connection conductors 30 correspond to the conductors 61 of the first embodiment. The flat cable 17 corresponds to the flat cable 62 of the first embodiment.

The insulation plate 20 is provided on the upper face 13 of the battery cell assembly 2 from which the positive electrodes 15 and negative electrodes 16 of the unit cells 11 are protruded. The insulation plate 20 includes a plate body 21 that covers the area in which the positive electrodes 15 and the negative electrodes 16 are protruded, and first electrode penetration slits 22 and second electrode penetration slits 23 formed on the plate body 21. The first electrode penetration slits 22 are horizontally formed so as to correspond to the positive electrodes 15 protruded from the battery cell assembly 2. Each of the positive electrodes 15 of the battery cell assembly 2 is drown out upward of the insulation plate 20 by penetrating each of the first electrode penetration slits 22 to protrude on the upper face side of the insulation plate 20. The second electrode penetration slits 23 are horizontally formed so as to correspond to the negative electrodes 16 protruded from the battery cell assembly 2. Each of the negative electrodes 15 of the battery cell assembly 2 penetrates each of the second electrode penetration slits 23 to protrude on the upper face side of the insulation plate 20.

Each of the connection conductors 30 (which corresponds to the conductors 61 of the first embodiment) connects the positive electrode 15 of one unit cell 11 and the negative electrode 16 of a unit cell 11 adjacent to this unit cell 11, and a plurality of these that correspond to the positive electrodes 15 or the negative electrodes 16 protruding from the battery cell assembly are arranged. Each connection conductor 30 includes a positive electrode connection end 31 (which corresponds to the first connection end 63 of the first embodiment) to be connected with the positive electrode 15 of the unit cell 11, a negative electrode connection end 32 (which corresponds to the second connection end in the first embodiment) to be connected with the negative electrode 16 of a unit cell 11 adjacent to this unit cell 11, and a conductor body 33 (which corresponds to the conductor body 64 of the first embodiment) to which the positive electrode connection end 31 is provided on one end and the negative electrode connection end 32 is provided on the other end, and is formed in a rising plate shape bent into a zigzag form. Connection between the positive electrode connection end 31 and the positive electrode 15, and connection between the negative electrode connection end 32 and the negative electrode 16 are made by a bolt and nut, terminal, clip, rivet, welding (laser, ultrasonic waves), or the like. In a case of the connection method other than welding, it is advantageous in that recycling of the unit cell 11 is possible.

With the connection conductor 30 having a structure in which the positive electrode connection end 31 and the negative electrode connection end 32 are formed on both sides of the conductor body 33, since it is possible to reverse it 180 degrees to make the positive electrode connection end 31 a negative connection end and to make the negative electrode connection end 32 a positive electrode connection end, connection that does not cause a connection error is possible.

The connection of the positive electrode 15 and the negative electrode 16 with the connection conductor 30 is made by a clip 34. That is, the positive electrode connection end 31 of the connection conductor 30 and the positive electrode 15 of the unit cell 11 are connected by being held by the clip 34, and the negative electrode connection end 32 of the connection conductor 30 and the negative electrode 16 of the unit cell 11 are connected by being held by the clip 34.

On the lower face of the positive electrode connection end 31 of each of the connection conductors 30, similarly to the first embodiment, a cutout part 35 is formed. By forming the cutout part 35, relative displacement of each of the connection conductors 30 and each of the connection terminals 50 becomes possible and they become mutually adjustable. Therefore, similarly to the first embodiment, by the connection between the core wire of the flat cable 17 and the cable connection terminal part 53, even if relative position between the positive electrode connection end 31 of each of the connection conductors 30 and the conductor connection terminal part 52 of each of the connection terminals 50 differs for each connection terminal 50, this difference in the relative position can be absorbed in the connection.

The flat cable 17 includes core wires arranged in parallel in the width direction, and a flexible covering body that covers the plurality of core wires. The flat cable 17 extends long along the direction of the conductors 30 at a position adjacent to the conductors 30, and is arranged to be approximately perpendicular to the longitudinal direction of the positive electrode connection ends 31 of the conductors 30. By arranging the flat cable 17 relative to the conductors 30 as such, the core wires within the flat cable 17 in the parallel state become in a state of being arranged along the direction that is separated away from the position adjacent to the conductors 30 in order. Each of the core wires within the flat cable 17 is connected to the corresponding connection conductor 30 via the corresponding connection terminal 50.

As illustrated in FIG. 3, the connection terminals 50 are provided on the insulation plate 20. Each of the connection terminals 50 connects the corresponding core wire of the flat cable 17 with the corresponding connection conductor 30. Each of the connection terminals 50, similarly to the first embodiment, includes a terminal body 51 that extends along the longitudinal direction of the connection conductors 30, and a conductor connection terminal part 52 and a cable connection terminal part 53 that are integrally formed at both ends in the longitudinal direction of the terminal body 51. The conductor connection terminal part 52 connects with the positive electrode connection end 31 of the connection conductor 30. The cable connection terminal part 53 connects with a core wire of the flat cable 17.

The conductor connection terminal part 52 is formed by being bent upward from an end of the terminal body 51. The conductor connection terminal part 52 includes a pair of gripping pieces 55 that grip the plate-like positive electrode connection end 31 of the connection conductor 30 from both sides.

The cable connection terminal part 53 is formed at an end on the flat cable 17 side of the terminal body 51, and includes a first pressure-welding part 56 which is integrally provided consecutively in the longitudinal direction of the terminal body 51, and second pressure-welding parts 57 provided on both sides of the first pressure-welding part 56 by being branched to the left and right from the terminal body 51. Pressure welding blades 58 of pointed tip bent upward are integrally formed at each of the first pressure-welding part 56 and the second pressure-welding parts 57. The pressure welding blades 58 of the first pressure-welding part 56 and the second pressure-welding parts 57 bite into the flat cable 17 so as to pierce the covering body of the flat cable 17, and by piercing the covering body the pressure welding blades 58 of the first pressure-welding part 56 and the second pressure-welding parts 57 are pressure-welded to the corresponding core wire within the covering body to be connected to the corresponding core wire.

In the second embodiment, it has a structure in which the positive electrodes 15 of the unit cells 11 are positioned on the same side (front side) on the upper face 13 of the battery cell assembly 2, and the connection conductors 30 (positive electrode connection ends 31) connect the positive electrodes 15 thus positioned on the same side among each other. Therefore, the flat cable 17 is drawn out in one direction such that it is connected to the positive electrodes 15 positioned on the same side of the battery cell assembly 2. Thus, it becomes unnecessary to draw out in two directions to be connected to the positive electrode 15 and the negative electrode 16. This makes the wiring of the flat cable 17 easy and its assemblability becomes satisfactory and downsizing as a product becomes possible.

Further, in the second embodiment, while the flat cable 17 is drawn out so as to connect the positive electrodes 15 of the unit cells 11 with each other, it is not limited to this, but it can be drawn out so as to connect the negative electrodes 16 with each other instead.

The case 40 includes a case body 41, a plurality of conductor insulation shelf parts 42 each standing from the case body 41, and a flat cable accommodation part 43.

The case body 41 constitutes the bottom face part of the case 40, and slits (not illustrated) through which the respective connection conductors 30 penetrate are formed. The conductor insulation shelf parts 42 stand from both sides of these slits. By the connection conductors 30 that have penetrated through the slits coming into the conductor insulation shelf parts 42, adjacent connection conductors 30 are insulated from each other. The flat cable accommodation part 43 is formed so as to be positioned on the positive electrode connection end 31 side of the connection conductor 30, that is, on the front side of the case body 41. The flat cable accommodation part 43 is formed such that it crosses the case 41 in the width direction on the front side of the case body 41. The flat cable 17 is accommodated inside the flat cable accommodation part 43.

A plurality of guide grooves 54 are formed on the case body 41 of the case 40. On the other hand, a plurality of guide pins 24 that correspond to the guide grooves 54 are protruded on the plate body 21 of the insulation plate 20. The guide pins 24 are formed horizontally on the front side and the back side of the insulation plate 20. The guide grooves 54 are formed horizontally on the front side and the back side of the case 40. Each of the guide grooves 54 is formed in a shape in which a large-diameter portion and a small-diameter portion are communicated with each other, and it is made such that the guide pin 24 is moveable from the large-diameter portion toward the small-diameter portion.

In assembly of the power supply device 1 according to the second embodiment, the insulation plate 20 is attached on the upper face 13 of the battery cell assembly 2 such that the positive electrodes 15 and the negative electrodes 16 of the unit cells 11 penetrate through the first electrode penetration slits 22 and the second electrode penetration slits 23, and the case 40 is attached to the insulation plate 20, and the connection conductors 30 are inserted into the conductor insulation shelf parts 42 of the case 40. Then, the flat cable 17 is wired within the flat cable accommodation part 43 of the case 40.

Thereafter, respective core wires of the flat cable 17 and the connection terminals 50 are connected. This connection is made by aligning the cable connection terminal part 53 of each of the connection terminals 50 with respect to each core wire of the flat cable 17, and then pressure-welding all the connection terminals 50 simultaneously. Thereafter, the conductor connection terminal part 52 of each of the connection terminals 50 is connected to the positive electrode connection end 31 of the corresponding connection conductor 30 on the insulation plate 20.

When connecting the cable connection terminal part 53 of each of the connection terminal 50 with the corresponding core wire of the flat cable 17, the core wires of the flat cable 17 are provided in parallel in the width direction of the flat cable 17. Therefore, extending length of the terminal body 51 of each of the connection terminals 50 differs depending on the position of the corresponding core wire in the width direction. Thus, relative position between the conductor connection terminal part 52 of each of the connection terminal 50 and the positive electrode connection end 31 of each of the connection conductors 30 differs depending on the position of the corresponding core wire of the flat cable 17 in the width direction, similarly to the first embodiment. On the other hand, the cutout part 35 is formed on the lower face of the conductor connection terminal part 52 of each of the connection conductors 30 such that each of the connection conductors 30 and each of the connection terminals 50 are capable of relative displacement. Therefore, even if the relative position between the positive electrode connection end 31 of each of the connection conductors 30 and the conductor connection terminal part 52 of each of the connection terminals 50 differs for each connection terminal 50, this difference in the relative position can be absorbed in the connection. In other words, the conductor connection terminal part 52 of each of the connection terminals 50 is capable of connection at any position that crosses the arrangement direction of the connection conductors 30. In such a structure, as the connection terminals 50 the same ones can be commonly used.

Further, by providing one or more grooves 31a at the positive electrode connection end 31 of each of the connection conductors 30 and positioning the conductor connection terminal part 52 at the groove 31a, as illustrated in FIG. 3, it becomes possible to hold the positioning of the conductor connection terminal part 52.

After connecting the connection conductors 30 to the connection terminals 50, the positive electrode connection ends 31 and the positive electrodes 15 are connected by holding with the clips 34, and at the same time, the negative electrode connection ends 32 and the negative electrodes 16 are connected by holding with the clips 34. At the time of these connections, positioning can be easily performed by shifting the case 40 with respect to the insulation plate 20 by the guide pins 24 and the guide grooves 54.

In the power supply device 1 according to the second embodiment, the flat cable 17 and the connection conductors 30 can be connected by using the connection terminals 50 each having the same shape. Therefore, it becomes unnecessary to use connection terminals of different lengths. Therefore, it is not necessary that a plurality of metal molds are used for manufacturing the connection terminals 50, and it is not only possible to reduce the cost of parts used but it also becomes easy to manage the connection terminals 50.

Moreover, since the connection conductors 30 having the same shape also can be used, it is not only possible to make the manufacturing of the connection conductors 30 easy but the management becomes easy also.

What is claimed is:

1. A connection structure for connecting a plurality of conductors having plate-like connection ends arranged in a plurality of rows and a flat cable arranged adjacent to the conductors to extend lengthwise along a direction that crosses a direction in which the plurality of rows of the conductors extend, comprising:
    the flat cable having a plurality of core wires arranged in parallel along the direction of the plurality of rows of the conductors, the flat cable being covered by a flexible covering body; and
    connection terminals each including a conductor connection terminal part provided on one end which is connectable to the connection ends of the conductors at any position in a direction that crosses the arrangement direction of the conductors, and a cable connection terminal part provided on the other end which is connected to the corresponding core wire of the flat cable,
wherein a connection position of the connection end of the corresponding conductor with the conductor connection terminal part is relatively displaced by the cable connection terminal part being connected to either one of the core wires of the flat cable.

2. The connection structure according to claim 1, wherein
the conductor connection terminal part includes a gripping piece capable of gripping the connection end of the corresponding conductor from both sides, and
the cable connection terminal part includes a pressure-welding part that is capable of piercing through the covering body and connectable to the corresponding core wire.

3. The connection structure according to claim 1, wherein
a cutout part that allows relative displacement of the connection position between the connection end of the corresponding conductor and the conductor connection terminal part is formed in a longitudinal direction of the connection end of the corresponding conductor.

4. A power supply device, comprising:
a plurality of unit cells from which positive electrodes and negative electrodes are protruded from upper faces thereof;
an insulation plate mounted on the upper faces of the plurality of unit cells, the insulation plate having electrode penetration slits through which the positive electrodes and the negative electrodes penetrate to be protruded on an upper face side;
a plurality of connection conductors having plate-like connection ends arranged in a plurality of rows on the insulation plate, the plurality of connection conductors connecting the positive electrodes and the negative electrodes of the plurality of unit cells respectively in series;
a flat cable arranged adjacent to the connection conductors, the flat cable having a plurality of core wires arranged in parallel along a direction of the plurality of rows of the connection conductors, the flat cable being covered by a flexible covering body; and
connection terminals each including a conductor connection terminal part provided on one end which is connectable to the connection end of the corresponding connection conductor at any position in a direction that crosses the arrangement direction of the corresponding connection conductor, and a cable connection terminal part provided on the other end which is connected to the corresponding core wire of the flat cable.

5. The power supply device according to claim 4, wherein
the conductor connection terminal part includes a gripping piece capable of gripping the connection end of the corresponding connection conductor from both sides, and
the cable connection terminal part includes a pressure-welding part that pierces through the covering body of the flat cable and is connectable to the corresponding core wire.

* * * * *